Figure 1:
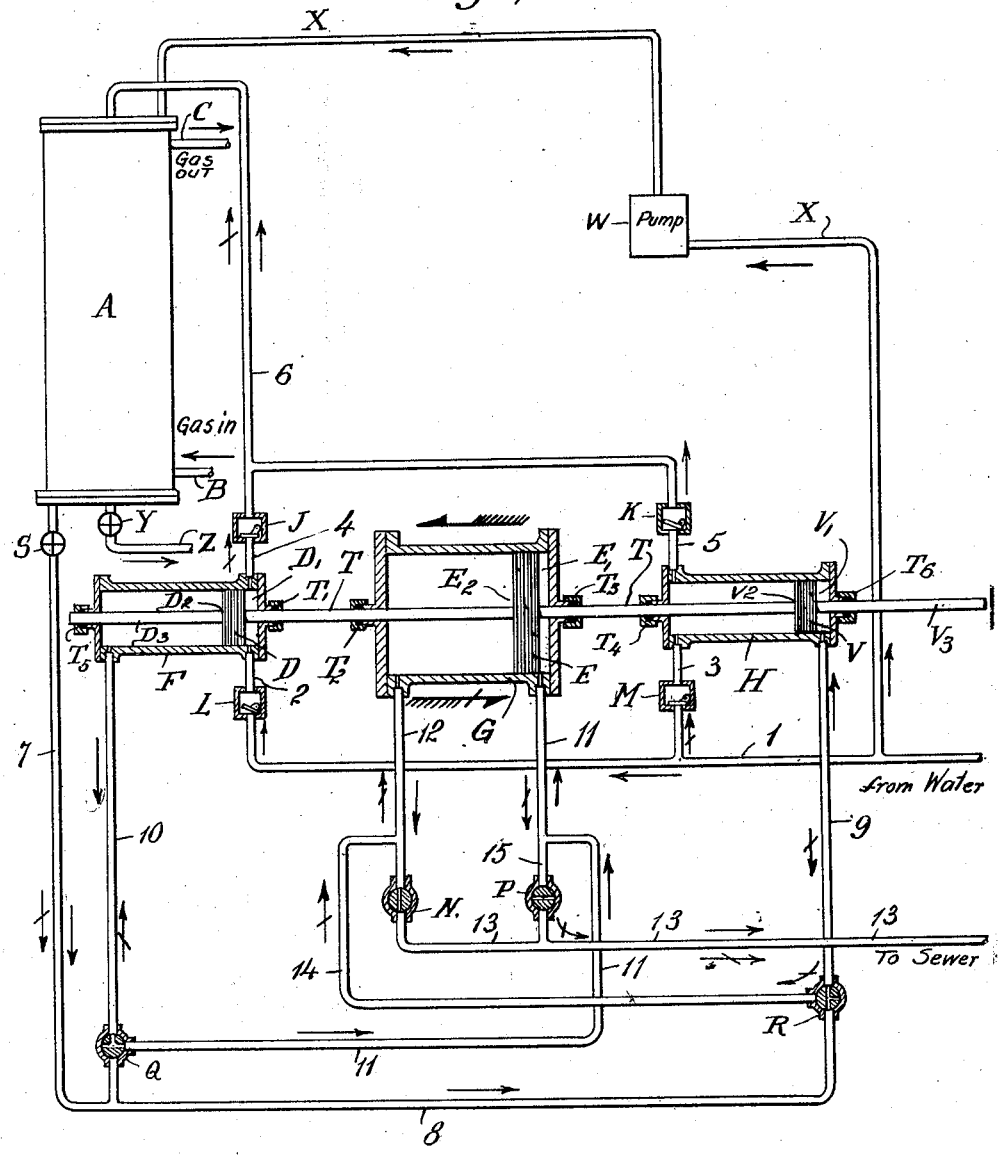

Aug. 25, 1931. H. S. LOUD 1,820,236
PROCESS AND APPARATUS FOR UTILIZING THE
ENERGY OF A LIQUID UNDER PRESSURE
Filed Nov. 6, 1928 2 Sheets-Sheet 1

INVENTOR
Henry S. Loud
BY
ATTORNEY

Aug. 25, 1931.                H. S. LOUD                    1,820,236
            PROCESS AND APPARATUS FOR UTILIZING THE
               ENERGY OF A LIQUID UNDER PRESSURE
                    Filed Nov. 6, 1928          2 Sheets-Sheet 2

INVENTOR
Henry S. Loud
BY
ATTORNEY

Patented Aug. 25, 1931

1,820,236

UNITED STATES PATENT OFFICE

HENRY S. LOUD, OF SYRACUSE, NEW YORK, ASSIGNOR TO ATMOSPHERIC NITROGEN CORPORATION, OF NEW YORK, N. Y., A CORPORATION OF NEW YORK

PROCESS AND APPARATUS FOR UTILIZING THE ENERGY OF A LIQUID UNDER PRESSURE

Application filed November 6, 1928. Serial No. 317,668.

This invention relates to process and apparatus for utilizing a liquid under pressure and more particularly a liquid containing releasable gas, to introduce a liquid into a system in which relatively high pressure conditions prevail and to circulate this liquid in said pressure system. It relates particularly to the art of gas purification or gas treatment with a liquid such as water under relatively high pressure conditions for the purpose of removing one or more of the gas constituents by means of the liquid medium, or for the purpose of conditioning the gas, during which treatment one or more of the gaseous constituents are dissolved in the liquid. Generally speaking, the usual procedure is to introduce the compressed gas into the bottom of a tower filled with packing material, and to pump the absorbing liquid into the top of the tower. The gas and liquid are brought into intimate contact during their counter-current travel over and through the packing of the tower, so that the gas leaves the tower freed from or with a decreased content of one or more ingredients and the liquid leaves the tower at the bottom saturated with these ingredients. Since the solution of a gas in a liquid is favored by pressure, it is often advisable to carry out such a process at a relatively high pressure. The process then consumes considerable power for the pumping of the liquid under pressure into the tower and for the compression of the gas to be treated. On the other hand, the saturated liquid leaving the tower, being still under the pressure of the system and containing gas held under pressure, has a potential energy content equivalent to that used in initially pumping the liquid (less incidental losses such as that due to friction in the circulating pipes) plus the energy used in initially compressing the gas now held by the liquid. This exit liquid is therefore not only an important potential source of power but this power, if recovered, should be sufficient to raise the pressure on and circulate further volumes of the absorbing liquid. In other words, the energy content of this exit or spent pressure liquid, including the energy content of its dissolved or releasable gas, if it could be recovered in usable form, would supply practically all the power required for maintaining the liquid circulation in the tower. If the amount of releasable gas is relatively large and the losses of energy, for example that due to friction, in the system are not abnormal, the recoverable energy might even exceed that required for the liquid circulation.

Attempts have been made in the past to recover and utilize the energy content of such liquids. The so-called Pelton water wheel apparatus represents one well known device for this purpose but its efficiency is unsatisfactory, due particularly to the disintegrating and disrupting effect which the gas escaping from the liquid has on the liquid jet from the Pelton nozzle. Proposals have also been made in an attempt to use the pressure saturated liquid as a direct agent for circulating further amounts of the liquid. For example, it has been proposed to let the pressure liquid act upon one face of a piston while the liquid to be circulated is brought in contact with the other face (U. S. P. 1,395,389 and 1,426,462 to Claude).

The object of the present invention is the development of a process and apparatus which is efficient and has advantages of construction and operation over the prior proposals.

According to the present invention the pressure liquid containing releasable gas is caused to act, for example, upon a face of a piston movable in a cylinder, or equivalent device, which piston in its movement forces or circulates a mass of the liquid to be circulated, which was introduced into the cylinder on the other side of the piston during the preceding stroke of the piston. There are at least two of these cylinders or equivalent devices with pistons operatively connected, for example, with a common piston rod and operated so that the pressure liquid flows into the two cylinders alternately and is discharged therefrom alternately, the liquid being introduced into one cylinder and discharged from the other cylinder during each stroke of the common piston rod. The result is, in effect, a double acting piston and therefore a continuous and uniform circulation of the liquid to be circulated. Further, by this method of operation the liquid to be circulated is entering one cylinder while the pressure liquid containing releasable gas is entering the other cylinder. Any initial pressure which the liquid to be circulated may have is thereby also made effective in causing movement of the common piston rod and therefore in producing the desired circulation. As the liquid to be circulated is often water from an industrial or city water pumping system, and as this liquid in any case may be given readily a small initial pressure if desired, this feature of the invention provides a convenient and controllable means for supplying any deficiency which might exist from time to time between the energy recovered from the pressure liquid and the energy necessary for the desired circulation of the other liquid.

The invention also provides for the utilization of energy of the releasable gas in the pressure liquid. For this purpose the pressure liquid discharged from the two cylinders or their equivalent, as already described, is introduced into a third cylinder also provided with a piston operatively connected with the other two pistons. The liquid as discharged alternately from the first two cylinders is introduced into the third cylinder alternately on opposite sides of the piston and in the direction of movement of the piston. This third cylinder has a larger cross section than the other two cylinders. Gas is therefore disengaged or released from the liquid in this cylinder and the expanding energy of this released gas is effective upon the two faces of the piston alternately.

The invention therefore provides for the recovery and utilization of both energy of the liquid phase of the pressure liquid and energy of releasable gas contained in the liquid by recovering these two energy fractions one after the other, but recovering them simultaneously from two masses of the liquid and in such a way that both energy fractions are directly and therefore simultaneously transferred to or caused to be effective upon a mass of the liquid to be circulated, whereby said mass of liquid is placed under a pressure condition and caused to move or circulate under that pressure. Other advantages and features of the invention will be described in connection with the drawings which represent the preferred method of operation.

The invention is of special utility in connection with the recovery of the energy content of a liquid discharged under high pressure from gas scrubbing apparatus in which it has been used for the purification of a compressed nitrogen-hydrogen gas for ammonia synthesis, and the utilization of this recovered energy for the circulation through the scrubbing apparatus of further volumes of the fresh or regenerated liquid. British Patent 124,761 to General Chemical Company, assignee of F. W. deJahn, describes this type of gas purification in connection with ammonia synthesis, and the present invention will be described with reference thereto although it is to be understood that this is merely one example of the use of the invention.

In this ammonia synthesis process a crude nitrogen-hydrogen gas is obtained which contains a relatively large proportion of carbon dioxide ($CO_2$) and small proportions of other impurities. This crude gas is then compressed to a pressure of approximately 95 atmospheres and scrubbed with water for removal of $CO_2$. The compressed gas is passed into the bottom of a packed tower into which, at the top, water is pumped. The water leaves the tower at the bottom still under the pressure of the system and saturated with $CO_2$. The accompanying drawings are with reference to the application of my invention to this pressure water scrubbing step in ammonia synthesis. Fig. 1 represents a sectional view of the apparatus of my invention in conjunction with a diagrammatic flow sheet of its operation; Fig. 2 shows a modification of the cylinder and piston design of Fig. 1.

Referring to Fig. 1, A is a water scrubbing tower containing suitable packing. The crude gas to be purified after compression to say about 95 atmospheres by compressors (not shown) enters the tower at B and leaves at C freed of the major portion of its $CO_2$ content. The pressure water for purification is forced into the tower through the pipe 6 and leaves through the pipe 7.

F, G and H are cylinders which, in view of their function, may be referred to as pump barrels. The walls and joints of these vessels are designed to be tight and to withstand a pressure somewhat in excess of that in the tower A. Cylinders F and H have the same inside cross section dimensions, while G is of larger cross section. D, E and V are pistons movable, in the cylinders F, G and H, with the common piston rod T which passes into the cylinders through the stuffing boxes $T_1$, $T_2$, $T_3$ and $T_4$. Pistons D and V are provided with tail rods $D_3$ and $V_3$ respectively which pass through stuffing boxes $T_5$ and $T_6$. By employing tail rods having the same diameter as piston rod T, the volume of fluid entering cylinders F and H during a stroke of the piston T will be equal to the volume of fluid displaced from the cylinders during that piston stroke. By employing tail rods having a diameter larger or smaller than that of piston rod T, or dispensing entirely with the tail rods, it is apparent that different ratios between the volume of fluid entering each cylinder and the volume of fluid displaced therefrom during a stroke of the piston may be obtained. In this manner, for example, the quantity of spent pressure liquid withdrawn from tower A into a cylinder by a stroke of piston T may be made substantially equivalent to the volume of liquid expelled from the cylinder and introduced into the tower by the same piston stroke. 1, 2, 3, 4, 5, 6, 7, 8, 9, 10, 11, 12, 13, 14 and 15 are the various pipe connections to and between the cylinders F, G and H, and between these cylinders and the scrubbing tower A. J, K, L, M, N, P, Q, R and S are valves in these various pipe connections, J, K, L and M being of the check valve type while Q and R are two way valves arranged to be automatically operated with each reversal in the piston stroke.

The cycle of operations is as follows, starting with the position of the valves as indicated in Fig. 1, i. e., valves K, L and N open, Q open to pipes 10 and 11, R open to pipes 8 and 9, and valves J, M and P closed. Valve S remains open during the entire cycle of operations. Pressure water containing large quantities of releasable $CO_2$ gas tends, because of its pressure conditions, to pass out of the scrubbing tower A, through pipe lines 7, 8 and 9, and into cylinder H, i. e., the pressure of this exit liquid acts on the face $V_1$ of the piston V. At the same time exit water which flowed into cylinder F during the preceding piston stroke, because of the expensive force of its releasable gas content, tends to pass out of the cylinder F through pipe connections 10 and 11 into cylinder G, so that the expansive force of this releasable gas acts on the corresponding face $E_1$ of piston E. Further, and at the same time, fresh water, due to the pressure, even though small, of the water in the main or reservoir from which it comes, tends to pass through the pipe lines 1 and 2 into the cylinder F, so that its pressure acts on the corresponding face $D_1$ of piston D. (Instead of fresh water, spent water which has been regenerated, for example, by release of the pressure in whole or part, i. e., the water from pipe 13, may be used.) There are, then, these three pressures acting simultaneously on the corresponding faces of the three pistons. The result is that the piston rod moves, the opposite face $V_2$ of the piston acts on the fresh water in cylinder H, which entered through pipe line 3 during the preceding piston stroke, and this fresh water is forced through pipe lines 5 and 6 into the top of the scrubbing tower A. At the same time the mixture of exit water and released gas which is in cylinder G from the preceding piston stroke flows out of the system through pipe lines 12 and 13. The one line arrows on Fig. 1 indicate the direction of liquid flow and of piston movement at this interval of the cycle, during which the energy of the liquid phase of a mass of the pressure exit water is being recovered in cylinder H, the energy of the releasable gas in another mass of the exit water is being recovered in cylinder G, and both of these energy fractions are being utilized directly and simultaneously to force a mass of the fresh water from the cylinder H into the scrubbing tower A. This condition continues until the piston rod has completed its length of travel. Valves K, L and N are then closed, Q opened to pipes 7 and 10, R opened to pipes 9 and 14, and valves J, M and P opened, all automatically. The same forces are then again effective, but upon the opposite faces of the pistons D, E and V. The pressure of the liquid phase of the exit water from the tower acts on the face $D_2$ of piston D, that of the releasable gas in the exit water of the preceding stroke on the face $E_2$ of piston E and the pressure of the fresh water on the face $V_2$ of piston V. A movement of the piston rod in the opposite direction and liquid flows are accordingly set up for the reasons already described in connection with the preceding stroke. The hatched arrows on Fig. 1 indicate the direction of the liquid flow and of the piston movement during this interval of the cycle. Pressure water flows from the tower into cylinder F through pipe lines 7 and 10, fresh water into cylinder H through pipe lines 1 and 3, and the pressure water which flowed into H through pipe lines 7, 8 and 9 during the preceding piston stroke just described now flows out of the cylinder through pipe lines 9, 14 and 12 and into cylinder G where, because of the larger cross section of the cylinder, dissolved $CO_2$ is released from the water and its expansive force becomes effective on face $E_2$ of piston E. At the same time the fresh water which entered cylinder F during the preceding stroke is forced from this cylinder and into the tower A through pipe lines 4 and 6, and the mixture of water and released gas in cylinder G from the preceding stroke escapes from the system through pipe lines 11, 15 and 13. This condition prevails until the piston rod has completed its return stroke when the valves are again automatically operated; valves K, L and N are opened, Q is opened to pipes 10 and 11, R is opened to pipes 8 and 9, and J, M and P are closed. Conditions are then as already described for the beginning of the cycle and the cycle of operations is complete. This cycle is then repeated as long as the operation is continued.

The operation of the apparatus is conveniently started and stopped by opening and closing valve S. The valve S may serve also as the means for regulating the rate of flow of water through the system or speed of the piston rod T, i. e., the invention provides a pumping device, the capacity of which can be readily varied.

The combination of the two cylinders F and H and pistons D and V give the effect of a double acting piston so that the circulating or pumping action of the apparatus is continuous and uniform.

Generally speaking, the difference in level of the water entering and leaving the scrubber, together with the resistance to the water flow in the pressure system due to friction, is a measure of the pressure differential between the water entering and leaving the tower. This represents the pressure loss in the system. This pressure differential is overcome and the energy necessary to complete the circulation of the pressure water is obtained by the recovery and utilization in the third cylinder of energy of the releasable gas and by introducing the fresh water into the system at a slightly elevated pressure; for example, 25–100 lbs. per square inch. It is evident that the greater the energy recovery from the releasable gas is (the greater the pressure and amount of this gas and the greater the difference in cross section between the first two and the third cylinders), the lower may be the initial pressure of the fresh water. Conversely, this invention may be used omitting recovery of energy from the releasable gas, i. e., omitting cylinder G of the apparatus and supplying the fresh water at a higher initial pressure. This invention accordingly provides a simple and effective way to compensate for incidental fluctuations in the energy recovery and utilization of a pressure liquid from such a scrubbing system. Such fluctuations may arise, for example, from temporary changes in the composition of the gas treated and therefore in the releasable gas content of the exit pressure liquid, and they are counter balanced and a uniform liquor circulation maintained by suitable adjustment of the initial pressure of the fresh water.

A further advantage of the invention is that it utilizes and produces high pressures in liquids without giving rise to objectionable high pressure differential conditions in the apparatus. Referring to Fig. 1, when cylinder F or H is under high pressure conditions, i. e., when the fresh water is being forced from the cylinder into the scrubbing tower under a pressure of about 100 atmospheres, the pressure differential on the two piston faces is only the pressure differential between the water going to and coming from the tower, or much less than 5 atmospheres under ordinary operating conditions. The danger of leaks is thereby greatly reduced.

It is evident that for successful operation of a scrubbing tower such as A of Fig. 1, the volume of liquid flowing or removed from the scrubbing tower should equal exactly the volume of liquid forced into the tower, so that once a liquor level is established in the bottom of the tower, that level should remain automatically fixed. This automatic maintenance of a liquid level in the scrubbing tower is another important advantage of this invention. This level, is, however, not exactly constant. A volume of exit liquor may not equal exactly the volume of an equivalent amount of the fresh ingoing water because of the gas which the exit liquor contains. Again, there will, of course, be some leakage, even though small, in the cylinders. As explained above, by the use of tail rods of appropriate size, the volume of exit liquor may be automatically made substantially equivalent to the volume of fresh ingoing water. Furthermore, either in addition to or in place of the employment of tail rods, a relatively small supplementary pressure pump W, inlet line X to and outlet line Z from the tower with valve Y, all as indicated in Fig. 1, may be used to take care of any such liquid level fluctuations.

Another advantage of the apparatus of Fig. 1 is that the strain on the piston rod is in the form of tension and not compression. By introducing the water to be circulated into the cylinders so that it is acted upon by the inner piston faces—faces $D_1$ and $V_2$, and not by the outer faces $D_2$ and $V_1$, the pressure transmitted to the water via the piston rod is in the sense of a pull and not a push on the rod. The result is that the piston rod may be of relatively simple design and small cross section.

Various modifications may be made in the form and arrangement of the apparatus while still practicing my invention. For example, Fig. 2 shows a modification of the cylinders F and G of Fig. 1 in the sense that instead of one cylinder with a double acting piston, there are two cylinders each with a single acting piston. Referring to the drawing, $F_1$, $F_2$, $H_1$ and $H_2$ are four cylinders of similar dimensions, provided with pistons $d_1$, $d_2$, $v_1$, and $v_2$ respectively, mounted on the common piston rod T. Pipe lines 2 and 4 are connected with cylinder $F_1$, pipe line 10 with cylinder $F_2$, pipe line 9 with cylinder $H_1$, and pipe lines 3 and 5 with cylinder $H_2$. It is evident that the pistons $d_1$, $d_2$, $v_1$, and $v_2$ correspond in function to the faces $D_1$, $D_2$, $V_1$ and $V_2$ respectively of Fig. 1, and that therefore the operation and effect of this apparatus is exactly like that of Fig. 1. One advantage of this arrangement is that a leak through or past the piston is not a leak from one liquid to the other as in the case of the apparatus of Fig. 1. Further, such a leak is at once apparent so that a defective packing or piston is readily detected.

Other modifications may be made in the form and arrangement of the apparatus while still practicing my invention, even although some modifications may not include all the advantages of the invention. For example, referring to Fig. 1, the piping arrangement might be slightly altered so that the pressure water from the tower always flows into the same cylinder F, against the two faces of the piston D alternately and so that the fresh water similarly always flows into the other cylinder H, alternately against the two faces of its piston V. It is evident that the various effective forces and their net results is exactly the same as described in connection with Fig. 1. This modified apparatus is more subject to leaks than that of Fig. 1 because of the larger difference in the pressures on the opposite faces of the pistons D and V. It is also evident that the piston rod will be under compression rather than tension during one of its two strokes.

The piping arrangement for apparatus of the type of Fig. 2 might be similarly modified.

While the invention has been described in connection with two or three double acting pistons or the equivalent number of single acting pistons, it is of course not limited to any definite number of piston or piston face elements, provided the action and effect of such corresponds and is equivalent to the subject matter of the invention as described and claimed.

I claim:

1. Apparatus for the circulation at an elevated pressure of a liquid utilizing the energy of a liquid under pressure which comprises a piston rod element provided with more than two piston faces movable in a housing, means for causing the liquid under pressure to act upon opposed piston faces alternately corresponding to the alternations in the stroke of the piston rod, means for causing the liquid to be circulated to simultaneously act upon piston faces corresponding to the piston faces upon which said liquid under pressure acts, and means for causing, simultaneously, piston faces opposed to the faces upon which said liquid is acting, to act upon portions of the liquid to be circulated, said opposed piston faces which contact with the liquid to be circulated being each a part of a double-acting piston element, another face of which contacts with the liquid under pressure.

2. Apparatus as set forth in claim 1, in which the relation between the piston faces which contact with the liquid to be circulated and the faces which contact with the liquid under pressure is such that the piston rod element during its movements is in a condition of tension rather than of compression.

3. Apparatus for scrubbing a gas with a circulating liquid under high pressure conditions, which comprises a scrubbing element and two cylinder elements provided with pistons operatively connected so that they move in unison, means for introducing during a stroke of the pistons spent pressure liquid from the scrubber into one cylinder, means for introducing liquid to be circulated into the other cylinder, and means for introducing during the return stroke of said pistons another portion of the first of said liquids into the second of said cylinders, and of the second of said liquids into the first of said cylinders, means for allowing the first of said liquids introduced during one stroke to escape during the following stroke to a lower pressure condition, and means for allowing the second of said liquids introduced during one stroke to pass into the scrubber during the following stroke, means for introducing the second of said liquids into either cylinder under such pressure that its pressure condition, together with the pressure of said first liquid introduced into the other cylinder acting on the respective pistons, is sufficient to cause movement of the pistons, thereby forcing into the scrubber the said second liquid introduced during the previous stroke and ejecting the said first liquid introduced during the previous stroke to said condition of lower pressure.

4. Apparatus as set forth in claim 3, in which the connection between the pistons of the two cylinder elements is a piston rod and in which the relation between the piston faces which contact with the spent pressure liquid and the faces which contact with the liquid to be circulated is such that the rod during its movements is in a condition of tension rather than of compression.

5. Apparatus as set forth in claim 3, in which the connection between the pistons of the two cylinder elements is a piston rod, and in which the spent pressure liquid is contacted with the outer piston faces and the liquid to be circulated is contacted with the inner piston faces, whereby the piston rod during its movements is in a condition of tension rather than of compression.

6. Apparatus as set forth in claim 3, in which the cylinder elements are provided with tail rods whereby at a stroke of the pistons the quantity of spent pressure liquid drawn into a cylinder element from the scrubber is substantially equivalent to the quantity of liquid introduced into the scrubber from a cylinder element.

7. Apparatus for the circulation at an elevated pressure of a liquid utilizing the energy of a liquid under pressure containing releasable gas, which comprises three cylinders, two of the cylinders having similar cross section dimensions and the third a larger cross section dimension, a movable piston in each cylinder, a piston rod connecting the three pistons, means for introducing liquid under pressure containing releasable gas alternately into the two similar cylinders against the outer piston face, means for introducing liquid to be circulated alternately into the said two cylinders against the inner piston face, the alternations corresponding to the piston stroke and the two liquids being introduced simultaneously into different cylinders, means for discharging, during one stroke of said two pistons, the liquids introduced during the previous stroke, means for introducing the liquid containing the releasable gas, as discharged from said two similar cylinders, into the third cylinder against the face of its piston corresponding to the direction of movement of the piston rod, and means for allowing the liquid thus introduced during one stroke, together with the gas released therefrom in the cylinder, to escape from the cylinder during the following stroke.

8. Apparatus for scrubbing a gas with a circulating liquid under high pressure conditions, whereby constituents are removed from said gas by said liquid and contained therein as releasable gas, which comprises a scrubbing element and three cylinder elements, two of said cylinders having the same cross section dimension and the third a larger cross section, pistons in the cylinders operatively connected so that they move in unison, means for introducing during a stroke of the pistons spent liquid from the scrubber containing releasable gas into one of the two similar cylinders, means for introducing liquid to be circulated into the other similar cylinder, means for introducing during the return stroke of said pistons another portion of the first of said liquids into the second of said two cylinders and of the second of said liquids into the first of said two cylinders, means for allowing the first of said liquids introduced during one stroke to escape during the following stroke into the third cylinder, means for allowing the liquid thus introduced during one stroke, together with the gas released therefrom in the cylinder, to escape during the following stroke, means for allowing the second of said liquids introduced into one of the two similar cylinders during one stroke to pass into the scrubber during the following stroke, means for introducing said second liquid into either of said two cylinders under such pressure that its pressure condition, together with the pressure of said first liquid introduced into the other of said two cylinders and the expansive force of the gas released in the third cylinder, acting on the respective pistons, is sufficient to cause movement of the pistons, thereby forcing into the scrubber said second liquid introduced during the previous stroke, ejecting into the third cylinder the said first liquid introduced during the previous stroke, and ejecting from the third cylinder the mixture of releasable gas and liquid contained therein from the previous stroke.

9. In the art of recovering and utilizing the energy of a liquid under pressure containing releasable gas, for subjecting a second liquid to an elevated pressure, that improvement which comprises recovering, first, energy of the liquid phase of the liquid under pressure and then energy of the releasable gas, recovering these two energy fractions simultaneously from different separate masses of the liquid and subjecting said second liquid to the pressure resulting from the simultaneous transfer of said two energy fractions to said liquid.

10. Apparatus for scrubbing a gas with a circulating liquid under high pressure conditions, which comprises a scrubbing element and two cylinder elements provided with pistons operatively connected so that they move in unison, means for introducing during a stroke of the pistons a regulated quantity of spent pressure liquid from the scrubber into one cylinder, means for introducing a substantially equivalent quantity of liquid to be circulated into the other cylinder, and means for introducing during the return stroke of said pistons a regulated quantity of another portion of the first of said liquids into the second of said cylinders and of a substantially equivalent quantity of the second of said liquids into the first of said cylinders, means for allowing the first of said liquids introduced during one stroke to escape during the following stroke, means for allowing the second of said liquids introduced during one stroke to escape during the following stroke, and means for moving the aforesaid pistons thereby forcing into the scrubber the said second liquid introduced during the second previous stroke and allowing the escape of the said first liquid introduced during the previous stroke.

In witness whereof, I have hereunto set my hand.

HENRY S. LOUD.